(12) United States Patent
Marcacci

(10) Patent No.: US 7,243,765 B2
(45) Date of Patent: Jul. 17, 2007

(54) STROKE STOP DEVICE OF THE SUSPENSIONS OF A VEHICLE

(75) Inventor: Maurizio Marcacci, Leghorn (IT)

(73) Assignee: Piaggio & C. S.p.A., Pontedera, Pisa (IT)

( * ) Notice: Subject to any disclaimer, the term of this patent is extended or adjusted under 35 U.S.C. 154(b) by 32 days.

(21) Appl. No.: 11/048,584

(22) Filed: Feb. 1, 2005

(65) Prior Publication Data

US 2005/0167217 A1 Aug. 4, 2005

(30) Foreign Application Priority Data

Feb. 4, 2004 (IT) ............................... MI04A0172

(51) Int. Cl.
*F16F 9/32* (2006.01)
(52) U.S. Cl. ..................................................... 188/300
(58) Field of Classification Search ................. 188/300
See application file for complete search history.

(56) References Cited

U.S. PATENT DOCUMENTS 4,484,648 A 11/1984 Jephcott 6,247,564 B1 * 6/2001 Kim ........................... 188/300

FOREIGN PATENT DOCUMENTS

| EP | 0 626 307 | 11/1994 |
| WO | WO 97/27071 | 7/1997 |
| WO | WO 02/44008 | 6/2002 |
| WO | WO 02/068228 | 9/2002 |

OTHER PUBLICATIONS

EPO Search Report.

* cited by examiner

*Primary Examiner*—Devon Kramer
(74) *Attorney, Agent, or Firm*—James V. Costigan; Hedman & Costigan

(57) ABSTRACT

Stroke stop device (1) for the suspensions of a vehicle of the type provided with at least one shock absorber (2) equipped with a first (3) and second (4) portion that can slide relatively. The device also comprises a pin element (44) integral with the first portion (3) of the shock absorber (2) and able to slide with respect to a caliper element (45) integral with the second portion (4) of the shock absorber (2). The caliper element (45) can be actuated closed to lock the sliding of the pin element (44) and to stop the stroke of the shock absorber (2).

4 Claims, 2 Drawing Sheets

STROKE STOP DEVICE OF THE SUSPENSIONS OF A VEHICLE

The present invention concerns a stroke stop device of the suspensions of a vehicle and in particular a stroke stop device of the suspensions of a two, three or four-wheeled vehicle. It is well known that currently in the field of vehicles a substantial diversification of models has gradually been proposed, in particular there is a growing interest towards "hybrid" vehicles that combine the characteristics of motorcycles, in terms of handling, with the stability of four-wheeled vehicles. Such models are, for example, represented by three-wheeled vehicles equipped with two steered front wheels and four-wheeled vehicles known by the name QUAD.

Such vehicles can, for example, be provided with two steered front wheels each equipped with an independent suspension.

Each suspension is also equipped with shock absorbers that are also independent.

During some manoeuvres, for example during temporary stops for parking or at traffic lights, it is important that the suspensions stop their stroke to avoid overbalancing that can cause the rider to fall off.

In light of the above, there is clearly a need to be able to have a stroke stop device, like that according to the present invention, which allows a vehicle to be provided that is stable and reliable in any travel condition or at rest.

Therefore, the purpose of the present invention is that of solving the problems of the prior art providing a stroke stop device of the suspensions that is reliable and safe and that ensures the stability of the vehicle in any travel condition thereof.

Another purpose of the present invention is that of providing a stroke stop device of the suspensions of a vehicle that is simple and cost-effective to produce. These and other purposes are accomplished by the stroke stop device of the suspensions of a vehicle according to the present invention that has the characteristics of the attached claim 1.

Further characteristics of the invention are highlighted in the subsequent claims.

Substantially, a stroke stop device of the suspensions of a vehicle according to the present invention is of the type equipped with at least one shock absorber provided with a first and second portion that can slide relatively and is characterised in that it comprises a pin element integral with the first portion of the shock absorber and able to slide with respect to a caliper element integral with the second portion of the shock absorber and in that the caliper element can be actuated closed to lock the sliding of the pin element and to stop the stroke of the shock absorber.

Further characteristics and advantages of the present invention shall become clearer from the present description, given for illustrating and not limiting purposes, with reference to the attached drawings, in which.

Figure 1:
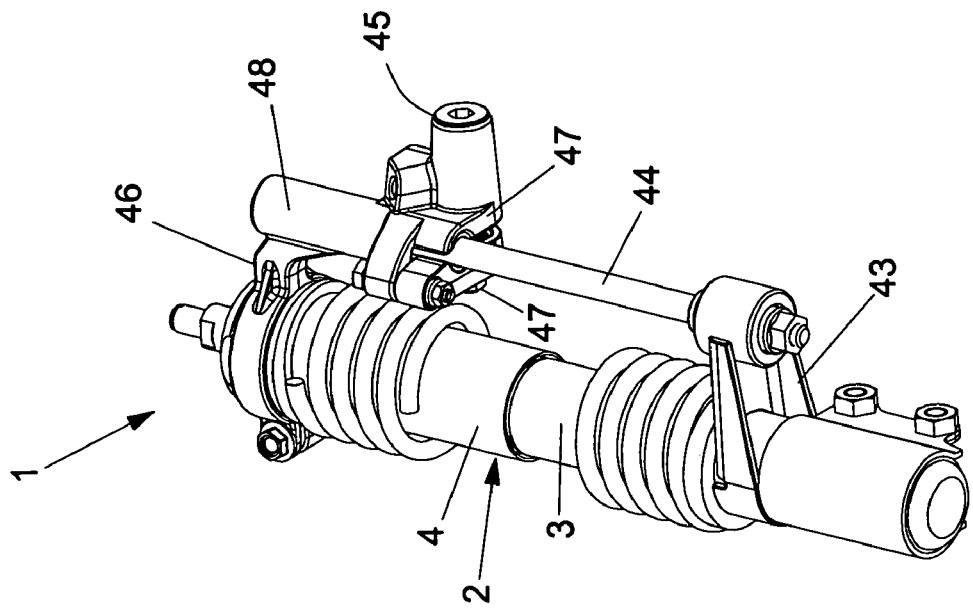
FIG. 1 is an axonometric view of a stroke stop device of the suspensions of a vehicle according to the present invention.
Figure 2:
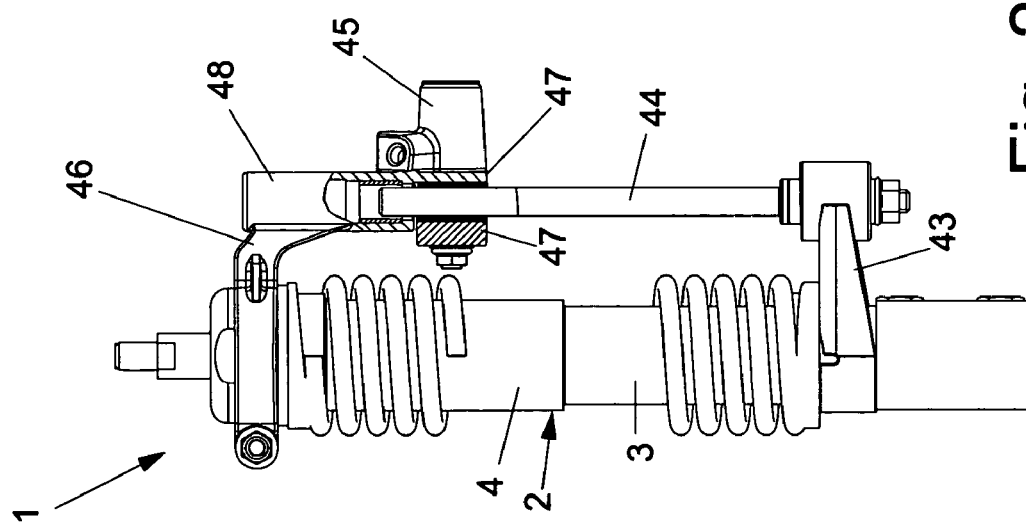
FIG. 2 is a partial section side view of the stroke stop device according to the present invention in stroke stop position.
Figure 3:
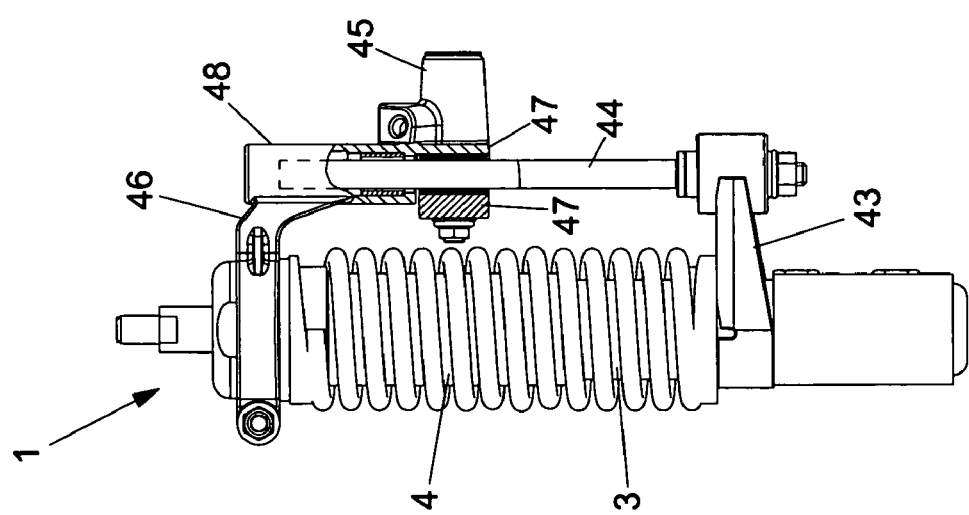
FIG. 3 is a partial section side view of the stroke stop device according to the present invention in free stroke position.

With reference to FIGS. 1, 2 and 3, a stroke stop device 1 of the suspensions of a vehicle is shown.

The suspension of a vehicle in a known way has at least one shock absorber 2 equipped with a first 3 and second 4 portion that can slide relatively.

The stroke stop device 1 according to the present invention comprises a pin element 44 integral with the first portion 3 of the shock absorber 2 and a caliper element 45 integral with the second portion 4 of the shock absorber 2.

The pin element 44 can slide axially with respect to the caliper element 45 in a bushing 48 foreseen above the caliper element 45. The latter can be actuated into closing to lock the sliding of the pin element 44 and consequently the stroke of the shock absorber 2.

The pin element 44 is made integral with the first portion 3 of the shock absorber 2 through a support bracket 43, whereas the caliper element 45 is made integral with the second portion of the shock absorber 2, the upper one in FIG. 1, through the support bracket 46.

The caliper element 45, as shown more clearly in FIG. 2, comprises two brake-shoes 47 that can close on the pin 44 by actuation of a hydraulic system.

In detail, the hydraulic system (not shown) comprises a hydraulic circuit and a pump actuated by command means. The actuation of the pump through the command means results in the closing of the brake-shoes 47.

The command means are of the manual type, in other words controlled by the driver of the vehicle, or of the automatic type, in other words controlled by some operating parameters of the vehicle.

The aforementioned hydraulic system shall not be described in greater detail, since it is known and in any case within the reach of the man skilled in the art.

The operation of the device according to the present invention is intuitive from that which has been stated above and in detail is the following.

When the caliper is open, as shown in FIG. 3, for example whilst the vehicle is travelling, the pin element 44 can slide freely axially with respect to the caliper element 45, in such a way allowing the suspension to work correctly allowing the shock absorber 2 to contract or expand.

The actuation into closing of the caliper 45 and in particular of the brake-shoes 47, due to the hydraulic system, causes the locking of the pin 44 and consequently the impossibility for the shock absorber 2 to contract or expand.

In other words, as shown in FIG. 2, the stroke of the suspension is locked.

Hereafter, the description shall be aimed at the application onto a rolling three-wheeled vehicle with two steered front wheels and a rear wheel, but it is clear how it must not be considered to be limited to this specific use.

Figure 4:
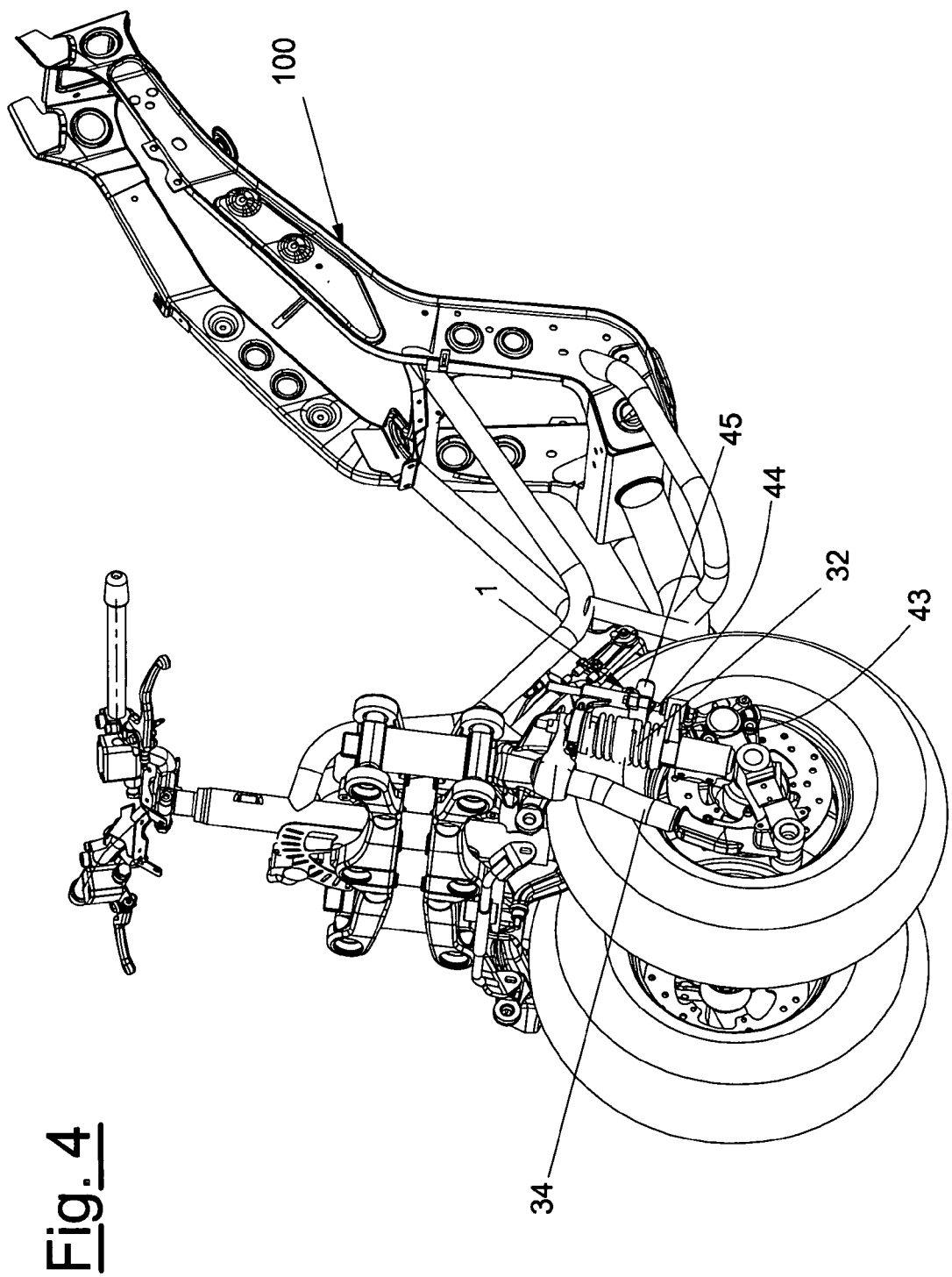
FIG. 4 is a perspective view of a three-wheeled vehicle equipped with two stroke stop devices according to the present invention.

The vehicle in question, the frame of which is wholly indicated with reference numeral 100, has two steered front wheels (see FIG. 4) and one fixed rear wheel (not shown).

The two front wheels are each equipped with an independent suspension 34, in turn provided with an independent shock absorber 32.

The vehicle also foresees a stroke stop device 1 according to the present invention, for each of the front suspensions 34, and an actuation group (not shown) guided by suitable control means for commanding the stroke stop devices 1.

The actuation group acts simultaneously on the stroke stop devices 1 of the front suspensions 34.

By means of the support brackets 43 the pins 44 are kept integral with the shock absorber of the front suspensions. At the opposite end of the shock absorbers the brake calipers 45, complete with support brackets 46, are also kept integral with the shock absorber. The pins 44 slide inside the bushings 48 between the brake-shoes 47 of the caliper elements 45. Upon the command of the control means, by means of the pump and the hydraulic circuit, the brake-shoes 47 lock the pins 44 and, consequently, stop the stroke of the suspensions. The present invention has been described for illustrating, but not limiting purposes, according to its preferred embodiments, but it should be understood that variations and/or modifications can be brought by men skilled in the art without for this reason departing from the relative scope of protection, as defined by the attached claims.

The invention claimed is:

1. Stroke stop device (1) for a vehicle suspension comprising at least one shock absorber (2) equipped with a first (3) and second (4) portion that can slide relatively, characterized in that it comprises a pin element (44) integral with said first portion or said shock absorber (3) and able to slide with respect to a caliper element (45) integral with said second portion (4) of said shock absorber (2) and in that said caliper element (45) can be actuated to a closed position to lock said pin element (44) to prevent the sliding of and to stop the stroke of said shock absorber (2) said stroke stop device (1) further characterized in that said caliper element (45) comprises at least one brake-shoe (47) that can be closed on said pin element (44) by actuation of a hydraulic system.

2. The stroke stop device (1) for the suspension of a vehicle according to claim 1, further characterized in that it comprises at least one bracket element (43) for making said pin element (44) integral with said first portion (3) of said shock absorber (2).

3. The stroke stop device for the suspension of a vehicle according to claim 1, further characterized in that it comprises at least one bracket element (45) for making said caliper element (45) integral with said second portion (4) of said shock absorber (2).

4. The stroke stop device for the suspension of a vehicle according to claim 1, further characterized in that said hydraulic system comprises a hydraulic circuit and a pump actuated by command means.

* * * * *